United States Patent
Zhou et al.

(10) Patent No.: US 11,602,690 B2
(45) Date of Patent: Mar. 14, 2023

(54) METHOD AND APPARATUS FOR CONTROLLING VIRTUAL CAMERA IN GAME

(71) Applicant: NETEASE (HANGZHOU) NETWORK CO., LTD., Zhejiang (CN)

(72) Inventors: Wenchao Zhou, Zhejiang (CN); Kun Shao, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 16/978,180

(22) PCT Filed: May 15, 2019

(86) PCT No.: PCT/CN2019/087071
§ 371 (c)(1),
(2) Date: Sep. 3, 2020

(87) PCT Pub. No.: WO2020/124944
PCT Pub. Date: Jun. 25, 2020

(65) Prior Publication Data
US 2021/0362056 A1    Nov. 25, 2021

(30) Foreign Application Priority Data

Dec. 19, 2018 (CN) .......................... 201811558206.0

(51) Int. Cl.
*A63F 9/24* (2006.01)
*A63F 13/525* (2014.01)
*G06T 15/20* (2011.01)

(52) U.S. Cl.
CPC ............ *A63F 13/525* (2014.09); *G06T 15/20* (2013.01); *G06T 2200/24* (2013.01)

(58) Field of Classification Search
CPC .......... A63F 2300/64; A63F 2300/6661; A63F 2300/6684; A63F 13/525; A63F 13/5258
See application file for complete search history.

(56) References Cited

U.S. PATENT DOCUMENTS 6,126,545 A * 10/2000 Takahashi ............... A63F 13/10
463/32
2012/0309519 A1* 12/2012 Hansen .................... A63F 13/00
463/31
2017/0361224 A1   12/2017 Takeda et al.

FOREIGN PATENT DOCUMENTS

| CN | 104740870 A | 7/2015 |
| CN | 106237615 A | 12/2016 |
| CN | 106528020 A | 3/2017 |
| CN | 107823882 A | 3/2018 |

(Continued)

*Primary Examiner* — Lawrence S Galka
(74) *Attorney, Agent, or Firm* — Gang Yu

(57) ABSTRACT

A method and apparatus for controlling a virtual camera in a game are disclosed. In the present disclosure, it is detected whether a movement of a virtual character toward a first direction satisfies a preset condition, when the preset condition is satisfied, a shifting direction of the virtual camera is determined, and the virtual camera is controlled to shift toward the shifting direction while moving according to a change of position of the virtual character, thereby a game scene image captured by the shifted virtual camera is displayed on a Graphical User Interface (GUI).

19 Claims, 5 Drawing Sheets

(56) References Cited

FOREIGN PATENT DOCUMENTS

| | | |
|---|---|---|
| CN | 107913520 A | 4/2018 |
| CN | 108196765 A | 6/2018 |
| CN | 108211342 A | 6/2018 |
| CN | 108211350 A | 6/2018 |
| CN | 108525300 A | 9/2018 |
| CN | 109718548 A | 5/2019 |
| JP | 2018112789 A | 7/2018 |

* cited by examiner

METHOD AND APPARATUS FOR CONTROLLING VIRTUAL CAMERA IN GAME

CROSS-REFERENCE TO RELATED APPLICATIONS

The present disclosure claims priority of Chinese Patent Application No. 201811558206.0, filed on Dec. 19, 2018 and named after "Method and Apparatus for Controlling Virtual camera in Game". Contents of the present disclosure are hereby incorporated by reference in entirety of the Chinese Patent Application.

TECHNICAL FIELD

The present disclosure relates to the technical field of electronic games, and in particular to a method and apparatus for controlling a virtual camera in a game.

BACKGROUND

In depression-angle large scroll map-type games such as Multiplayer Online Battle Arena (MOBA) games, most of the MOBA games are to fix hero characters controlled thereby in the middle or nearby positions of a screen, while a role distance of some skills is very far, even exceeding the screen of the game. A player knows nothing about the role of the skill, and cannot effectively use advantages of the distance for this skill.

SUMMARY

According to an embodiment of the present disclosure, a method for controlling a virtual camera in a game is provided. The method may be applied to a touch terminal rendered with a graphical user interface (GUI), contents displayed by the GUI may include a game scene image captured by the virtual camera, the game scene image may at least include a virtual character, and the method may include that:

the virtual camera is associated with a position of the virtual character in the game scene to control a movement of the virtual camera according to a change of the position of the virtual character;

it is detected whether a movement of the virtual character on the GUI toward a first direction satisfies a preset condition;

when the movement of the virtual character toward the first direction satisfies the preset condition, a shifting direction of the virtual camera is determined according to the first direction; and the virtual camera is controlled to shift toward the shifting direction while moving according to the change of the position of the virtual character, in order to display the game scene image captured by the shifted virtual camera shifts on the GUI.

According to another embodiment of the present disclosure, an apparatus for controlling a virtual camera in a game is provided. The apparatus may be applied to a touch terminal rendered with a GUI, contents displayed by the GUI may include a game scene image captured by the virtual camera, the game scene image may at least include a virtual character, and the apparatus may include at least one processor, and at least one memory for storing a program element, where the program element is executed by the at least one processor. The program element may include:

an association component, configured to associate the virtual camera with a position of the virtual character in the game scene to control a movement of the virtual camera according to a change of the position of the virtual character;

a detection component, configured to detect whether a movement of the virtual character on the GUI toward a first direction satisfies a preset condition;

a determination component, configured to determine, when the movement of the virtual character on the GUI toward the first direction satisfies the preset condition, a shifting direction of the virtual camera according to the first direction; and a control component, configured to control the virtual camera to shift toward the shifting direction while moving according to the change of the position of the virtual character, in order to display the game scene image captured by the shifted virtual camera on the GUI.

According to another embodiment of the present disclosure, the present disclosure also provides a non-transitory storage medium, on which at least one computer program is stored, the at least one computer program being executed by a processor to implement the following steps: the virtual camera is associated with a position of a virtual character in a game scene to control a movement of the virtual camera according to a change of the position of the virtual character; it is detected whether a movement of the virtual character on a GUI toward a first direction satisfies a preset condition; when the movement of the virtual character toward the first direction satisfies the preset condition, a shifting direction of the virtual camera is determined according to the first direction; and the virtual camera is controlled to shift toward the shifting direction while moving according to the change of the position of the virtual character, in order to display the game scene image captured by the shifted virtual camera shifts on the GUI.

According to another embodiment of the present disclosure, the present disclosure also provides an electronic device. The device may include a memory and a processor. The memory is connected with the processor and configured to store at least one executable instruction of the processor, wherein the processor is arranged to execute the at least one executable instruction, and the at least one executable instruction comprises: the virtual camera is associated with a position of a virtual character in a game scene to control a movement of the virtual camera according to a change of the position of the virtual character; it is detected whether a movement of the virtual character on a GUI toward a first direction satisfies a preset condition; when the movement of the virtual character toward the first direction satisfies the preset condition, a shifting direction of the virtual camera is determined according to the first direction; and the virtual camera is controlled to shift toward the shifting direction while moving according to the change of the position of the virtual character, in order to display the game scene image captured by the shifted virtual camera shifts on the GUI.

BRIEF DESCRIPTION OF THE DRAWINGS

FIG. 5-1 is a schematic diagram of an area desired to be observed by a user according to one embodiment of the present disclosure;

FIG. 5-2 is a schematic diagram of an area captured by a lens after screen dragging according to one embodiment of the present disclosure;

DETAILED DESCRIPTION OF THE EMBODIMENTS

It should be noted that in the case of no conflict, features in the embodiments and the embodiments in the present disclosure may be combined with each other. The disclosure is described below with reference to the drawings and in conjunction with the embodiments in detail.

In order to make those skilled in the art better understand the solutions of the present disclosure, the technical solutions in the embodiments of the present disclosure will be clearly and completely described below with reference to the drawings in the embodiments of the present disclosure.

Figure 1:
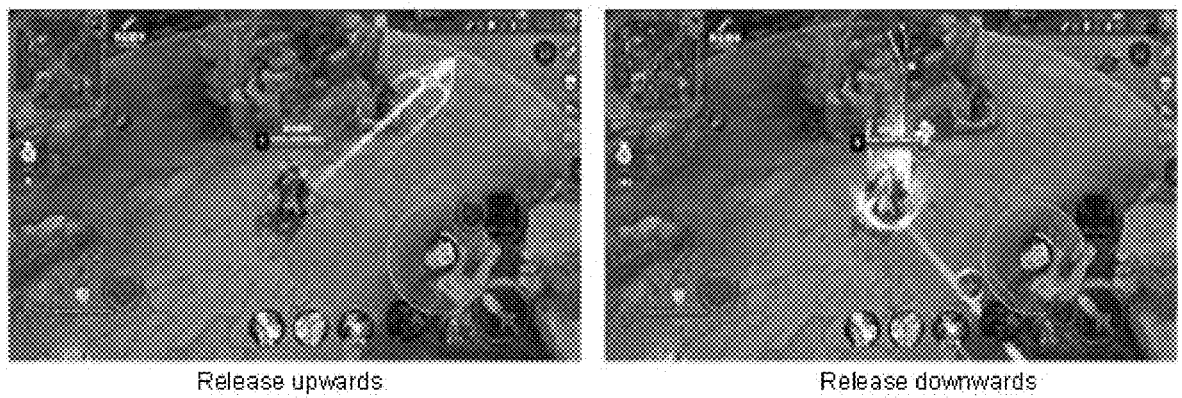
FIG. 1 is a schematic diagram of releasing game skills from different perspectives in an existing game.

Since some MOBA games use an angle of view that tilts part of the angle, this will result in that a full range can be seen when the some skills are released upwards, but only part of the range or only half of the range can be seen when the some skills are released downwards. As shown in FIG. 1, this will result in great disadvantages. Coupled with the limitation of a viewing angle output device (a mobile phone, a tablet, etc.), when a player needs to observe a game scene outside a screen where a game character is located in, the player needs to drag the screen.

When the screen is dragged, it is necessary to take an additional hand (usually the right hand), but most of time, especially when facing fierce confrontation, the player needs to control a movement operation with the left hand and needs to prepare for a skill operation with the right hand. The player cannot drag the screen with any hand to keep continuously observing a scene worthy of attention. Therefore, when the game character controlled by the player travels to the scene worthy of attention, a strategic purpose of the player cannot be effectively achieved for the information of the scene worthy of attention has changed significantly.

Figure 2:
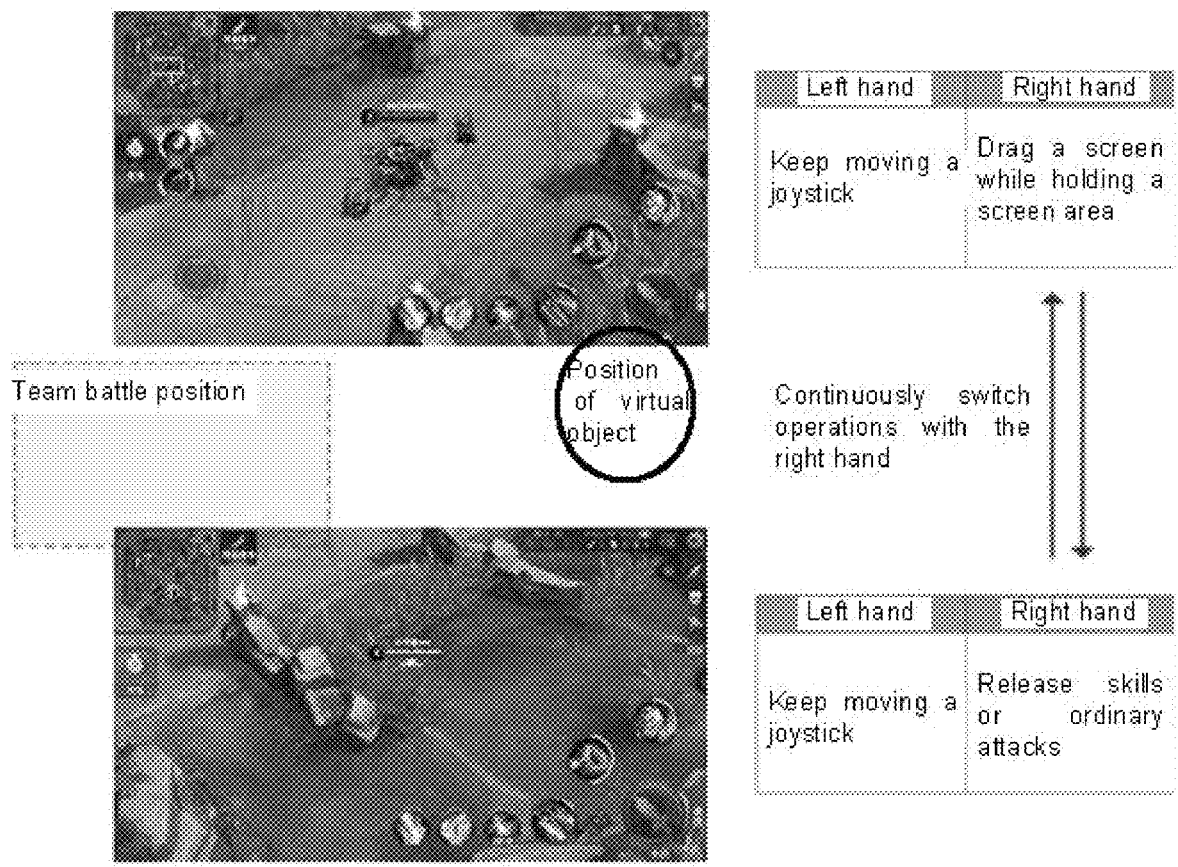
FIG. 2 is a schematic diagram of implementing a screen dragging operation in an existing game.

FIG. 2 is a schematic diagram of a skill operation in an existing game. The inventor found in research that a player continuously controls a movement with a left hand and frequently switches an operation of releasing a skill or making an ordinary attack and an operation of dragging a screen (referred to as "screen dragging" or "screen dragging operation") with a right hand. Usually, the player drags the screen with the right hand to observe a battlefield outside the screen firstly. When the time is right, the player makes an operation of loosening on a dragged screen area and makes an operation of pressing a skill button to enter the battlefield with the right hand. The player drags the screen again to observe the battlefield after makes an operation of releasing the skill, and makes an operation of loosening again and makes an operation of releasing the skill again. The operations above are repeated for many times. Those operations has high operation difficulty. Frequent switching with the right hand will increase a risk of misoperation. After the screen dragged with the right hand is loosened, a lens flashes back to its screen of hero, that is, an image where a virtual character is located. when the screen is dragged once again, the lens is switched to the battlefield outside the screen, and so forth. A game master will even switch back and forth at a high speed. The rapid switching of the image will result in extreme visual discomfort.

Figure 3:
FIG. 3 is another schematic diagram of implementing a screen dragging operation in an existing game.

Referring to FIG. 3, as shown in FIG. 3, the inventor also found that when a player operates, the player continuously controls a movement with the left hand and controls an operation of releasing a skill or making an ordinary attack (usually with the thumb) and an operation of dragging a screen (usually with a index finger) with two fingers of a right hand respectively. This operation method is commonly known as "C hand" or "three fingers". The C-hand operation may include left C-hand and right C-hand. The left C-hand refers to controlling a small map with the left index finger and controlling movement with the left thumb. The right C-hand refers to controlling screen dragging with a right index finger and controlling skill release and ordinary attacks with a right thumb. FIG. 3 shows a control method of the right C-hand. Although the control method does not require frequent back and forth operations with one finger of the right hand, the control method is very difficult and requires a strong coordination ability of a finger of the player, which is generally only completed by professional players.

Figure 4:
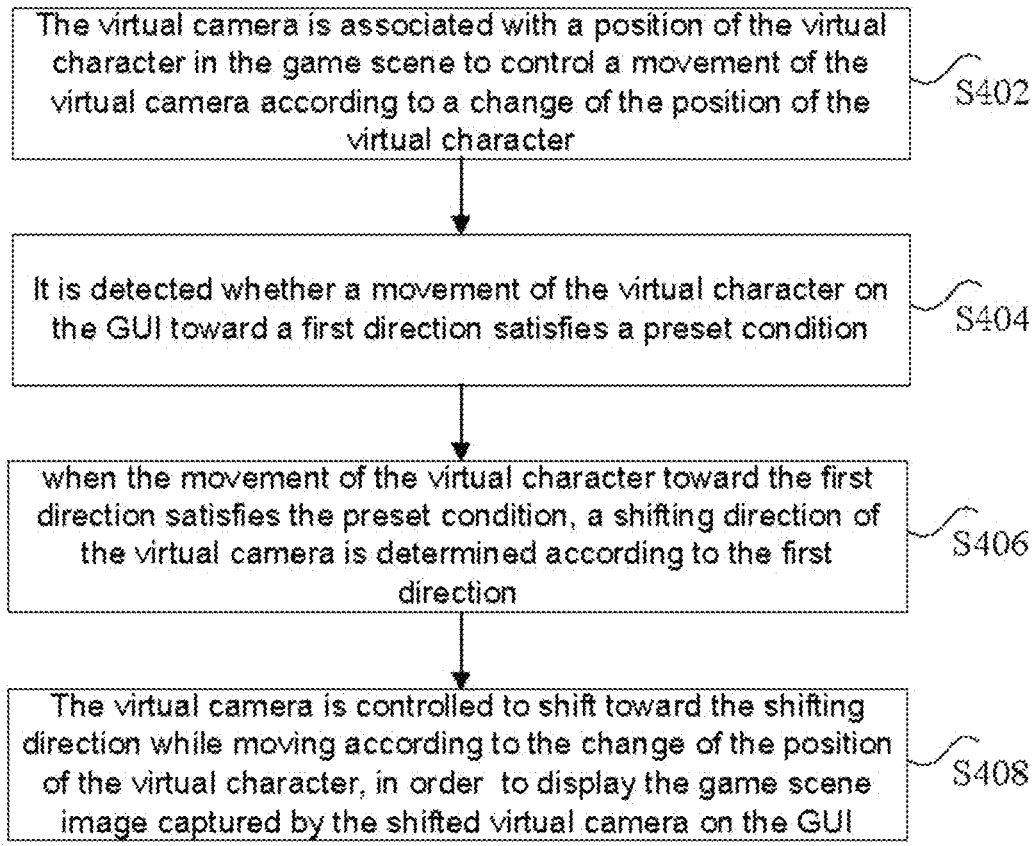
FIG. 4 is a schematic flowchart of a method for controlling a virtual camera in a game according to one embodiment of the present disclosure.

Through a research on above existing solutions, the operation method of dragging the screen in the game is optimized in the present disclosure. A method for controlling a virtual camera in a game provided by this embodiment of the present disclosure is applied to a touch terminal rendered with a GUI, contents displayed by the GUI includes a game scene image captured by the virtual camera, and the game scene image at least includes a virtual character. Referring to FIG. 4, as shown in FIG. 4, the method may include the following steps.

At step S402, the virtual camera is associated with a position of the virtual character in the game scene to control a movement of the virtual camera according to a change of the position of the virtual character.

In this method, a virtual camera (herein referred to as a "lens") is associated with the position of a virtual character in a game scene, that is, an association relationship between the position of the virtual camera and the position of the virtual character in the game scene is established, for example, a mapping relationship for maintaining a fixed distance between the position of the virtual camera and the position of the virtual character in the game scene is established. A shooting angle of the virtual camera may be maintained at a default angle unchanged. Therefore, when the position of the virtual character changes, the virtual camera also following the virtual character to move.

At step S404, it is detected whether a movement of the virtual character on the GUI toward a first direction satisfies a preset condition.

The GUI is an important part of a touch screen terminal. As an interface for interacting with a user, who may operate the GUI. In addition to displaying the game scene image captured by the virtual camera, the GUI may also receive touch operations from the user through the touch screen, for example, a game running is controlled in a touch terminal.

In the embodiment of the present disclosure, the movement of the virtual camera follows the change of the position of the virtual character. Therefore, the movement/the change of the position of the virtual character is regarded as a condition for controlling the virtual camera in the present disclosure. First, it is detected whether the movement of the virtual character on the GUI toward the same direction satisfies a preset condition. The preset condition herein includes: a movement distance of the virtual character toward the first direction reaches a preset distance, or a movement duration of the virtual character toward the first direction reaches a preset duration.

At step S406, when the movement of the virtual character on the GUI toward the first direction satisfies the preset condition, a shifting direction of the virtual camera is determined according to the first direction.

When the player/virtual character continues to move in a certain direction, for example, a distance of continuous movement toward the first direction reaches a preset distance, or a duration of continuous movement toward the first direction reaches a preset duration, it indicates that the user wants to observe a game scene/battlefield in this direction (first direction). Therefore, in order to meet the needs of the user to observe the game scene/battlefield, and also meet the security of the virtual character, this direction (first direction) may be determined as a direction of controlling the virtual camera to shift.

Figures 1, 5:
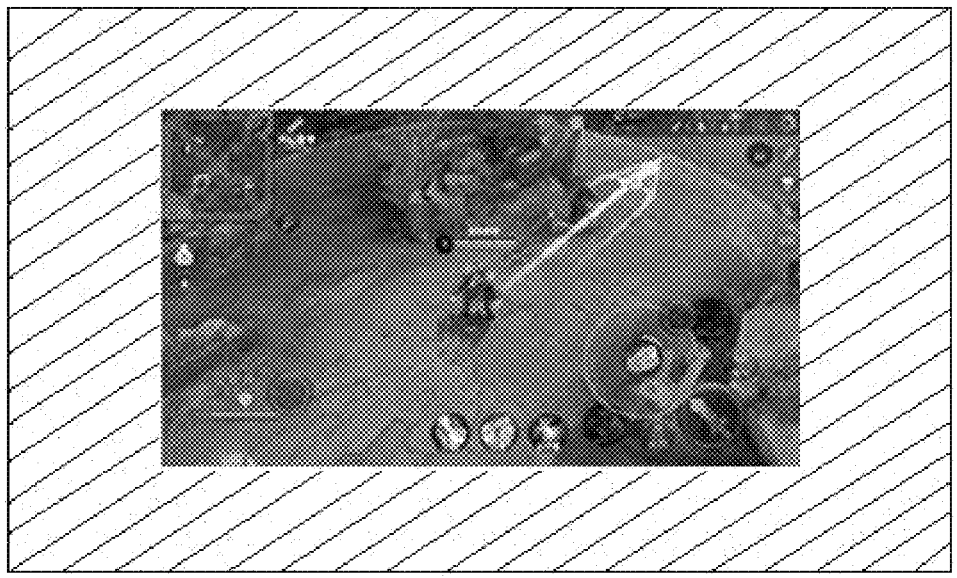
Figures 2, 5:

When the player/user wants to observe a dynamics outside the screen, referring to FIG. 5-1, as shown in FIG. 5-1, a slash area is outside the screen, but it is the range that the player wants to observe. Therefore, it is necessary to control and adjust the game scene image displayed on the screen, and pull an image displayed outside the screen into the current screen for displaying. Therefore, when a terminal detects that the user continues to control the virtual character to move in the first direction, a shifting direction of the virtual camera is determined according to the first direction. Optionally, the shifting direction of the virtual camera is consistent with a direction of a movement of the virtual character, that is, the shifting direction is the first direction, in line with an expectation of the user.

In a possible embodiment, the shifting direction may also be set to an opposite direction of the first direction, or a relationship between the shifting direction and the first direction may be determined according to battle factors in the game. The battle factors described herein may be a battle area, current game value information of the virtual character, advantages and disadvantages of two opponents in the game, etc.

For example, a possible embodiment is: when a purpose of judging that the virtual character continues to move in the first direction is to control the shifting direction to be consistent with the first direction when the virtual character is approaching the battle area, so as to be convenient for the player to observe a battle situation in the battle area in advance; and when a purpose of judging that the virtual character continues to move in the first direction is to control the shifting direction to be the opposite direction of the first direction in order to control the virtual character to escape from the baffle area, so as the player can observe whether an enemy is following. The battle area refers to a scene area where a game battle occurs between the two opponents in the game or a scene area where an enemy unit is located in the game. The judgment of the battle area may be determined by a game system according to preset logics.

For example, another possible embodiment is: when the virtual character is currently in a low blood state (that is, when the blood is lower than a preset value), the shifting direction is controlled to be the opposite direction of the first direction. When the virtual character is currently in a high blood state (that is, when the blood is higher than a preset value), the shifting direction is controlled to be consistent with the first direction. The blood refers to a kind of game value information indicating survival status of the virtual character in the game. In an optional implementation method, other game value information is selected as a factor controlling a relationship between the shifting direction and the first direction according to needs of the game. There are no restrictions herein.

At step S408, the virtual camera is controlled to shift toward the shifting direction while moving according to the change of the position of the virtual character, in order to display the game scene image captured by the shifted virtual camera on the GUI.

When the virtual character moves, the virtual camera also follows to move, and the movement of the virtual camera and the movement of the virtual character maintain a fixed relationship. After the shifting direction is determined, in addition to continuing to control the virtual camera to follow the virtual character, the virtual camera is also controlled to shift in a certain degree. After the virtual camera shifts, the game scene image captured by the lens also changes accordingly, that is, the screen shifts. Therefore, the game scene image captured by the virtual camera shifted is displayed on the GUI. Referring to FIG. 5-2, as shown in FIG. 5-2, shaded area is a newly obtained observation area. At this time, although a game character/virtual character is not in the middle or nearby positions of the screen, there may be a very good field of view.

It should be noted that the steps shown in the flowchart of FIG. 4 may be executed in a computer system including, for example, a set of computer-executable instructions. Moreover, although a logic sequence is shown in the flowchart, the shown or described steps may be executed in a sequence different from the sequence here under certain conditions.

From the above, in the present disclosure, it is detected whether the movement of the virtual character toward the first direction satisfies the preset condition, when the preset condition is satisfied, the shifting direction of the virtual camera is determined, and the virtual camera is controlled to shift toward the shifting direction while moving according to the change of the position of the virtual character, thereby a game scene image captured by the virtual camera shifted is displayed on the GUI. It is not necessary for a user to perform an additional separate operation, that is, a virtual camera may be placed at a suitable position by a player without a separate view control operation (such as a screen dragging operation). Under a premise of ensuring that an original left hand operation and right hand operation are not affected, it is more convenient for the user to observe an image scene captured by lens shifted, so that the user can focus on an operation experience which is truly fun, thereby the problems of high difficulty in frequent screen dragging operations or long-time screen dragging operations and easy misoperation are solved.

As an optional implementation manner, the operation that the virtual camera is controlled to shift toward the determined shifting direction while moving according to the change of the position of the virtual character may include that:

a first distance of the movement of the virtual character when the virtual character satisfies the preset condition is determined;

an offset corresponding to the virtual character is acquired according to an average speed of the virtual character moving within the first distance; and the virtual camera is controlled to shift toward the shifting direction to a position corresponding to the offset after the virtual camera following the virtual character to move for the first distance.

It should be noted that when the preset condition is that the movement distance of the virtual character toward the first direction reaches the preset distance, it is determined that the first distance here is the preset distance, and when the preset condition is that the duration of the movement of the virtual character toward the first direction reaches the preset duration, it is determined that the first distance here is a distance of the movement of the virtual character moving within the preset duration.

An urgency of the player entering the battlefield/observation area can be seen according to a speed of the movement of the virtual character. Therefore, in the present implementation method, an offset is determined according to an average speed of the movement of the virtual character, and a server may be requested for the offset according to a table of mapping relationship between the average speed and the offset or the generated average speed. The offset corresponding to a high average speed may be greater than the offset corresponding to a low average speed, that is, when the virtual character moves fast, the virtual character can shift for a greater distance to make the player quickly observe the battlefield situation.

It should be noted that "the virtual camera is controlled to shift toward the shifting direction to a position corresponding to the offset after the virtual camera following the virtual character to move for the first distance" described here means that the virtual camera also follows to move according to the association relationship when the virtual character moves. When the preset condition is satisfied, the virtual camera is automatically shifted, and the shifting distance is the offset, so as to reach the position corresponding to the offset.

Further, after the virtual camera is controlled to shift toward the shifting direction while moving according to the change of the position of the virtual character, the method further includes that:

it is detected whether the virtual character is in a state of moving toward the first direction currently; and when the virtual character is not in the state of moving toward the first direction currently, the virtual camera is controlled to move toward a direction opposite to the first direction for a distance of the offset.

In the present implementation method, after the virtual camera is shifted, it is detected whether the virtual character continues to move toward the first direction. When the virtual character does not continue to move toward the first direction, it indicates that the player may no longer care about the battle situation in the first direction and may want to observe in other areas, so the virtual camera slowly returns to a normal state, including a distance corresponding to the offset of the movement of the virtual camera toward the opposite direction of the first direction is controlled, and the movement of the virtual camera according to the change of the position of the virtual character is continuously controlled.

Further, the method for controlling a virtual camera further includes that:

when it is detected that the virtual character is in the state of moving toward the first direction currently, the virtual camera is controlled to start following the change of the position of the virtual character to move from the position corresponding to the offset.

It should be noted that when it is detected that the virtual character is currently moving toward the first direction, it indicates that the user still wants to go to the first direction and observe the battle situation in the front. Therefore, at this time, the movement of the virtual camera is still controlled according to the change of the position of the virtual character, that is, the virtual camera moves with the change of the position of the virtual character after shifting.

As a preferred implementation method, the operation that the virtual camera is controlled to move toward the direction opposite to the first direction for the distance of the offset may include that:

the virtual camera is controlled to move toward the direction opposite to the first direction for the distance of the offset in a speed increasing manner.

When the virtual character does not continue to move toward the first direction, the player wishes to leave the battlefield in the first direction at this time, so the user has a higher priority for leaving. In order to facilitate the user to observe a exit path and leave more quickly, a speed of returning the virtual camera to normal may be increased, that is, the speed of controlling the virtual camera to move toward the opposite direction of the first direction is gradually increased. It should be noted that an acceleration corresponding to the gradual increase in the speed of the virtual camera may be changed or not changed, which is not limited in the present disclosure.

Optionally, the operation that the virtual camera is controlled to move toward the direction opposite to the first direction for the distance of the offset includes that:

the virtual camera is controlled to move from a first position to a second position, wherein the second position is a position reached by the virtual camera after following the virtual character to move for the first distance, and the first position is a position reached by the virtual camera after shifting toward the shifting direction for the offset after moving for the first distance.

The virtual camera is controlled to move toward the direction opposite to the first direction for a distance of the offset, that is, the virtual camera is controlled to return from the position after shifting to the position before shifting.

Figure 6:
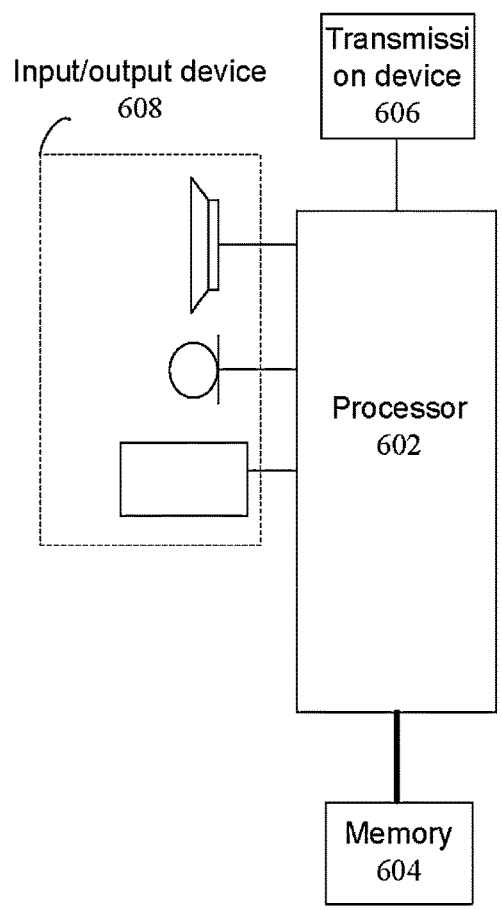
FIG. 6 is a block diagram of a hardware structure of a mobile terminal running a method for controlling a virtual camera in a game according to one embodiment of the present disclosure.

The method embodiment provided by the embodiments of the present disclosure may be executed in a mobile phone, a tablet, or a similar touch screen control device. Running on a mobile terminal is taken as an example. FIG. 6 is a block diagram of a hardware structure of a mobile terminal for a method for controlling a virtual camera in a game according to an embodiment of the present disclosure. As shown in FIG. 6, the mobile terminal may include at least one (only one is shown in FIG. 1) processor 602 (the processor 602 may include but is not limited to a processing apparatus such as a Micro Controller Unit (MCU) or a Field Programmable Gate Array (FPGA)) and a memory 604 for storing data. Optionally, the above mobile terminal may further include a transmission device 606 and an input/output device 608 for communication functions. Those skilled in the art can understand that the structure shown in FIG. 6 is merely illustrative, and does not limit the structure of the above mobile terminal. For example, the mobile terminal may also include more or fewer components than shown in FIG. 6, or has a different configuration from that shown in FIG. 6.

The memory 604 may be configured to store at least one computer program, for example, a software program and component of application software, such as at least one computer program corresponding to the method for controlling a virtual camera in a game in the embodiment of the present disclosure, and the processor 602 executes various functional applications and data processing by running the at least one computer program stored in the memory 604, that is, implements the above method. The memory 604 may include a high speed random access memory and may also include a non-transitory memory such as at least one magnetic storage devices, a flash memory, or other non-transitory solid state memories. In some examples, the memory 604 may further include memories remotely located relative to the processor 602, which may be connected to the mobile terminal over a network. The examples of such networks include, but are not limited to, the Internet, the Intranet, the local area networks, the mobile communication networks, and combinations thereof.

The transmission device 606 is configured to receive or send data via a network. The above specific network example may include a wireless network provided by a communication provider of the mobile terminal. In one example, the transmission device 606 includes a Network Interface Controller (NIC) that may be connected to other network devices through a base station to communicate with the Internet. In one example, the transmission device 606 may be a Radio Frequency (RF) module for communicating with the Internet wirelessly.

An embodiment of the present disclosure also provides an apparatus for controlling a virtual camera in a game. It should be noted that the apparatus for controlling the virtual camera in the game in this embodiment may be used for performing the method for controlling the virtual camera in the game in the embodiment of the present disclosure.

Figure 7:
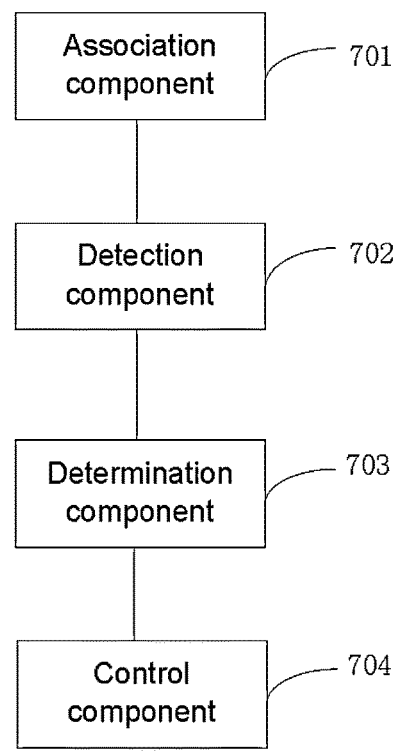
FIG. 7 is a schematic structural diagram of an apparatus for controlling a virtual camera in a game according to one embodiment of the present disclosure.

FIG. 7 is a schematic structural diagram of an apparatus for controlling a virtual camera in a game according to an embodiment of the present disclosure. The apparatus is applied to a touch terminal rendered with a GUI, contents displayed by the GUI includes a game scene image captured by the virtual camera, the game scene image here at least includes a virtual character, and the apparatus includes at least one processor, and at least one memory for storing a program element, wherein the program element is executed by the at least one processor. The program element may include an association component, a detection component, a determination component, and a control component. As shown in FIG. 7, the apparatus includes: an association component 701, a detection component 702, a determination component 703, and a control component 704.

The association component 701 is configured to associate the virtual camera with a position of the virtual character in the game scene to control a movement of the virtual camera according to a change of the position of the virtual character.

The detection component 702 is configured to detect whether a movement of the virtual character on the GUI toward a first direction satisfies a preset condition.

The determination component 703 is configured to determine, when the movement of the virtual character on the GUI toward the first direction satisfies the preset condition, a shifting direction of the virtual camera according to the first direction.

The control component 704 is configured to control the virtual camera to shift toward the shifting direction while moving according to the change of the position of the virtual character, in order to display the game scene image captured by the shifted virtual camera on the GUI.

It should be noted that the association component 701, the detection component 702, the determination component 703, and the control component 704 may be run in a terminal as part of the device. Functions implemented by the above components may be executed by at least one processor in the terminal. The terminal may also be a smart phone (such as an Android phone or an iOS phone), a tablet, a palmtop, a Mobile Internet Device (MID), a PAD, or other terminal devices.

In this embodiment, the detection component 702 detects whether a movement of a virtual character toward a first direction satisfies a preset condition, when the preset condition is satisfied, the determination component 703 determines a shifting direction of the virtual camera, and the control component 704 controls the virtual camera to follow the virtual character to move and shift toward the shifting direction, thereby a game scene image captured by the shifted virtual camera is displayed on a GUI. The virtual camera may be placed at a suitable position by a user without an additional separate view control operation. Under the premise of ensuring that an original left hand operation and an original right hand operation are not affected, it is more convenient for the user to observe an image scene after the virtual camera shifting, so that the user can focus on an operation experience of a truly fun, thereby the problems of high difficulty in frequent screen dragging operations or long-time screen dragging operations and easy misoperation are solved.

The method and apparatus for controlling a virtual camera in a game according to the present disclosure are described by way of example with reference to the accompanying drawings. However, those skilled in the art should understand that various improvements can be made to the method and apparatus for controlling a virtual camera in a game proposed in the present disclosure, without departing from the contents of the present disclosure. Therefore, the scope of protection of the present disclosure should be determined by the contents of the appended claims.

An embodiment of the present disclosure also provides a non-transitory storage medium. The non-transitory storage medium stores at least one computer program, where the at least one computer program is configured to control a device where the non-transitory storage medium is located to perform the steps in any one of the above method embodiments during running.

Figure 8:
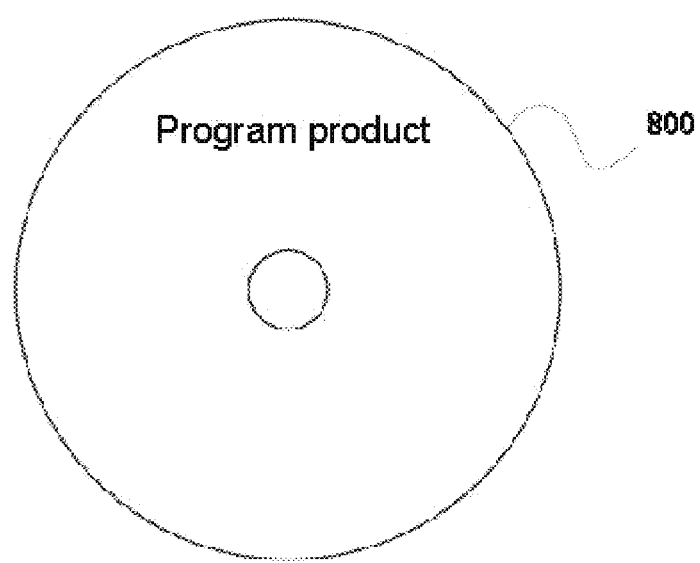
FIG. 8 is a structural schematic diagram of a storage medium according to an embodiment of the present disclosure.

FIG. 8 is a structural schematic diagram of a storage medium according to an embodiment of the present disclosure. As shown in FIG. 8, a program product 800 according to an implementation manner of the present disclosure is described. At least one computer program is stored thereon. The at least one computer program being executed by a processor to implement the following steps:

the virtual camera is associated with a position of the virtual character in the game scene to control a movement of the virtual camera according to a change of the position of the virtual character;

it is detected whether a movement of the virtual character on the GUI toward a first direction satisfies a preset condition;

when the movement of the virtual character toward the first direction satisfies the preset condition, a shifting direction of the virtual camera is determined according to the first direction; and the virtual camera is controlled to shift toward the shifting direction while moving according to the position change of the virtual character to display the game scene image captured by the shifted virtual camera shifts on the GUI.

Optionally, the at least one computer program is executed by the processor to implement a program code for the following steps:

a first distance of the movement of the virtual character when the virtual character satisfies the preset condition is determined;

an offset corresponding to the virtual character is acquired according to an average speed of the virtual character moving within the first distance; and the virtual camera is controlled to shift toward the shifting direction to a position corresponding to the offset after the virtual camera following the virtual character to move for the first distance.

Optionally, the at least one computer program is executed by the processor to implement a program code for the following steps:

after the virtual camera is controlled to shift toward the shifting direction while moving according to the change of the position of the virtual character, it is detected whether the virtual character is in a state of moving toward the first direction currently; and when the virtual character is not in the state of moving toward the first direction currently, the virtual camera is controlled to move toward a direction opposite to the first direction for a distance of the offset.

Optionally, the at least one computer program is executed by the processor to implement a program code for the following steps:

the virtual camera is controlled to move toward the direction opposite to the first direction or the distance of the offset in a speed increasing manner.

Optionally, the at least one computer program is executed by the processor to implement a program code for the following steps:

the virtual camera is controlled to move from a first position to a second position, wherein the second position is a position reached by the virtual camera after following the virtual character to move for the first distance, and the first position is a position reached by the virtual camera after shifting toward the shifting direction for the offset after moving for the first distance.

Optionally, the at least one computer program is executed by the processor to implement a program code for the following steps:

when it is detected that the virtual character is in the state of moving toward the first direction currently, the virtual camera is controlled to start following the change of the position of the virtual character to move from the position corresponding to the offset.

Optionally, in the present embodiment, the non-transitory storage medium may also be configured as a program code for determining various preferred or optional method steps provided by the method for controlling a virtual camera in a game.

By means of the above implementation method, it is not necessary for a user to perform an additional separate operation, that is, a virtual camera may be placed at a suitable position by a player without a separate view control operation (such as a screen dragging operation). Under the premise of ensuring that the original left and right hand operations are not affected, it is more convenient for the user to observe an image scene after lens shifting, so that the user can focus on a truly fun operation experience, thereby the problems of high difficulty in frequent screen dragging operations or long-time screen dragging operations and easy misoperation are solved.

The non-transitory storage medium may include a data signal that is propagated in a baseband or as part of a carrier, carrying readable program code. Such propagated data signals may take a variety of forms, including but not limited to, electromagnetic signals, optical signals, or any suitable combination of the foregoing. Then non-transitory storage medium may send, propagate, or transmit a program for using by or in connection with an instruction execution system, device or apparatus.

Program codes included in the non-transitory storage medium may be transmitted by any suitable medium, including but not limited to wireless, wire, optical cable, radio frequency, etc., or any suitable combination of the foregoing. Optionally, in the present embodiment, the storage medium may include, but is not limited to, various media capable of storing at least one computer program such as a U disk, a Read-Only Memory (ROM), a Random Access Memory (RAM), a mobile hard disk, a magnetic disk or an optical disc.

An embodiment of the present disclosure also provides an electronic device, which includes a processor and a memory connected with the processor and configured to store at least one executable instruction of the processor. The memory stores at least one computer program. The processor is configured to run the at least one computer program to perform the steps in any one of the above method embodiments, which may be a mobile terminal as shown in FIG. 6.

Optionally, the electronic device may further include a transmission device and an input/output device, where the transmission device is connected to the processor, and the input/output device is connected to the processor.

Optionally, the electronic device may also be configured to perform the following steps:

the virtual camera is associated with a position of the virtual character in the game scene to control a movement of the virtual camera according to a change of the position of the virtual character;

it is detected whether a movement of the virtual character on the GUI toward a first direction satisfies a preset condition;

when the movement of the virtual character toward the first direction satisfies the preset condition, a shifting direction of the virtual camera is determined according to the first direction; and the virtual camera is controlled to shift toward the shifting direction while moving according to the change of the position of the virtual character, in order to display the game scene image captured by the shifted virtual camera shifts on the GUI.

Optionally, the electronic device may also be configured to perform the following steps:

a first distance of the movement of the virtual character when the virtual character satisfies the preset condition is determined;

an offset corresponding to the virtual character is acquired according to an average speed of the virtual character moving within the first distance; and the virtual camera is controlled to shift toward the shifting direction to a position corresponding to the offset after the virtual camera following the virtual character to move for the first distance.

Optionally, the electronic device may also be configured to perform the following steps:

after the virtual camera is controlled to shift toward the shifting direction while moving according to the change of the position of the virtual character, it is detected whether the virtual character is in a state of moving toward the first direction currently; and when the virtual character is not in the state of moving toward the first direction currently, the virtual camera is controlled to move toward a direction opposite to the first direction for a distance of the offset.

Optionally, the electronic device may also be configured to perform the following steps:

the virtual camera is controlled to move toward the direction opposite to the first direction for the distance of the offset in a speed increasing manner.

Optionally, the electronic device may also be configured to perform the following steps:

the virtual camera is controlled to move from a first position to a second position, wherein the second position is a position reached by the virtual camera after following the virtual character to move for the first distance, and the first position is a position reached by the virtual camera after shifting toward the shifting direction for the offset after moving for the first distance.

Optionally, the electronic device may also be configured to perform the following steps:

when it is detected that the virtual character is in the state of moving toward the first direction currently, the virtual camera is controlled to start following the change of the position of the virtual character to move from the position corresponding to the offset.

By means of the above implementation method, it is not necessary for a user to perform an additional separate operation, that is, a virtual camera may be placed at a suitable position by a player without a separate view control operation (such as a screen dragging operation). Under the premise of ensuring that the original left and right hand operations are not affected, it is more convenient for the user to observe an image scene after lens shifting, so that the user can focus on a truly fun operation experience, thereby the problems of high difficulty in frequent screen dragging operations or long-time screen dragging operations and easy misoperation are solved.

The processor may execute various function applications and data processing by running application programs and components stored in the memory. That is, the method for controlling a virtual camera in a game is implemented.

Obviously, the described embodiments are only a part of the embodiments of the present disclosure, not all of the embodiments. All other embodiments obtained by those of ordinary skill in the art based on the embodiments of the present disclosure without creative efforts should fall within a scope of protection of the present disclosure.

It should be noted that the specification and claims of the present disclosure and the terms "first", "second" and the like in the drawings are used to distinguish similar objects, and do not need to describe a specific sequence or a precedence order. It will be appreciated that data used in such a way may be exchanged under appropriate conditions, in order that the embodiments of the present disclosure described here can be implemented. In addition, terms "include" and "have" and any variations thereof are intended to cover non-exclusive inclusions. For example, it is not limited for processes, methods, systems, products or devices containing a series of steps or components to clearly list those steps or components, and other steps or components which are not clearly listed or are inherent to these processes, methods, products or devices may be included instead.

Obviously, those skilled in the art should understand that the above-mentioned components or steps of the present disclosure may be implemented by a general-purpose computing device, and they may be centralized on a single computing device or distributed on a network composed of multiple computing devices. Optionally, they may be implemented with program codes executable by a computing device, so that they may be stored in a storage device and executed by the computing device, and in some cases, the steps shown or described may be performed in a different order than here, or they are separately made into individual integrated circuit modules, or multiple components or steps therein are made into a single integrated circuit module for implementation. As such, the present disclosure is not limited to any particular combination of hardware and software.

The above is only the preferred embodiments of the present disclosure, not intended to limit the present disclosure. As will occur to those skilled in the art, the present disclosure is susceptible to various modifications and changes. Any modifications, equivalent replacements, improvements and the like made within a principle of the present disclosure shall fall within the scope of protection of the present disclosure.

INDUSTRIAL APPLICABILITY

In the present disclosure, it is detected whether a movement of a virtual character toward a first direction satisfies a preset condition, when the preset condition is satisfied, a shifting direction of the virtual camera is determined, and the virtual camera is controlled to shift toward the shifting direction while moving according to the change of the position of the virtual character, thereby a game scene image captured after the virtual camera shifted is displayed on a GUI. It is not necessary for a user to perform an additional separate operation, that is, the virtual camera may be placed at a suitable position by a player without a separate view control operation (such as a screen dragging operation). Under the premise of ensuring that the original left and right hand operations are not affected, it is more convenient for the user to observe an image scene after the virtual camera shifted, so that the user can focus on a truly fun operation experience, thereby the problems of high difficulty in frequent screen dragging operations or long-time screen dragging operations and easy misoperation are solved.

What is claimed is:

1. A method for controlling a virtual camera in a game, applied to a touch terminal rendered with a graphical user interface (GUI), contents displayed by the GUI comprising a game scene image captured by the virtual camera, the game scene image at least comprising a virtual character, the method comprising:

associating the virtual camera with a position of the virtual character in the game scene to control a movement of the virtual camera according to a change of the position of the virtual character;

detecting whether a movement of the virtual character on the GUI toward a first direction satisfies a preset condition;

when the movement of the virtual character toward the first direction satisfies the preset condition, determining a shifting direction of the virtual camera according to the first direction; and controlling the virtual camera to shift toward the shifting direction according to an offset corresponding to the virtual character, while moving according to the change of the position of the virtual character, in order to display the game scene image captured by the shifted virtual camera on the GUI;

wherein the preset condition comprises: a movement distance of the virtual character toward the first direction reaches a preset distance, or a duration of the movement of the virtual character toward the first direction reaches a preset duration.

2. The method as claimed in claim 1, wherein controlling the virtual camera to shift toward the shifting direction while moving according to the change of the position of the virtual character comprises:
- determining a first distance of the movement of the virtual character when the virtual character satisfies the preset condition;
- acquiring the offset corresponding to the virtual character according to an average speed of the virtual character moving within the first distance; and
- controlling the virtual camera to shift toward the shifting direction to a position corresponding to the offset after the virtual camera following the virtual character to move for the first distance.

3. The method as claimed in claim 2, wherein after controlling the virtual camera to shift toward the shifting direction while moving according to the change of the position of the virtual character, the method further comprises:
- detecting whether the virtual character is in a state of moving toward the first direction currently; and
- when the virtual character is not in the state of moving toward the first direction currently, controlling the virtual camera to move toward a direction opposite to the first direction for a distance of the offset.

4. The method as claimed in claim 3, wherein controlling the virtual camera to move toward the direction opposite to the first direction for the distance of the offset comprises:
- controlling the virtual camera to move toward the direction opposite to the first direction for the distance of the offset in a speed increasing manner.

5. The method as claimed in claim 3, wherein controlling the virtual camera to move toward the direction opposite to the first direction for the distance of the offset comprises:
- controlling the virtual camera to move from a first position to a second position, wherein the second position is a position reached by the virtual camera after following the virtual character to move for the first distance, and the first position is a position reached by the virtual camera after shifting toward the shifting direction for the offset after moving for the first distance.

6. The method as claimed in claim 3, further comprising:
- when detecting that the virtual character is in the state of moving toward the first direction currently, controlling the virtual camera to start following the change of the position of the virtual character to move from the position corresponding to the offset.

7. The method as claimed in claim 1, wherein associating the virtual camera with the position of the virtual character in the game scene comprises:
- establishing a mapping relationship for maintaining a fixed distance between a position of the virtual camera and the position of the virtual character in the game scene.

8. The method as claimed in claim 1, further comprising:
- maintaining a shooting angle of the virtual camera at a default angle.

9. The method as claimed in claim 1, wherein determining a shifting direction of the virtual camera according to the first direction comprises one of the following steps:
- determining the first direction as the shifting direction of the virtual camera;
- determining a direction opposite to the first direction as the shifting direction of the virtual camera;
- determining a relationship between the shifting direction and the first direction according to battle factors in the game, wherein the relationship between the shifting direction and the first direction is used for determining the shifting direction of the virtual camera.

10. The method as claimed in claim 2, wherein determining the first distance of the movement of the virtual character when the virtual character satisfies the preset condition comprises:
- when the preset condition is that the movement distance of the virtual character toward the first direction reaches the preset distance, determining the preset distance as the first distance of the movement of the virtual character.

11. The method as claimed in claim 2, wherein determining the first distance of the movement of the virtual character when the virtual character satisfies the preset condition comprises:
- when the preset condition is that the duration of the movement of the virtual character toward the first direction reaches the preset duration, determining a distance of the movement of the virtual character moving within the preset duration as the first distance of the movement of the virtual character.

12. The method as claimed in claim 2, wherein acquiring an offset corresponding to the virtual character according to an average speed of the virtual character moving within the first distance comprises:
- requesting a server for the offset according to a table of mapping relationship between the average speed and the offset, or according to the average speed.

13. The method as claimed in claim 2, wherein the offset corresponding to a high average speed of the virtual character is greater than the offset corresponding to a low average speed of the virtual character.

14. The method as claimed in claim 2, wherein controlling the virtual camera to shift toward the shifting direction to the position corresponding to the offset after the virtual camera following the virtual character to move for the first distance comprises:
- controlling the virtual camera to follow to move for the first distance according to an association relationship between the position of the virtual camera and the position of the virtual character in the game scene when the virtual character moves, and when the preset condition is satisfied, controlling the virtual camera to automatically shift for a distance of the offset, so as to control the virtual camera to shift toward the shifting direction to the position corresponding to the offset.

15. The method as claimed in claim 2, wherein after controlling the virtual camera to shift toward the shifting direction while moving according to the change of the position of the virtual character, the method further comprises:
- detecting whether the virtual character is in a state of moving toward the first direction currently; and
- when the virtual character is not in the state of moving toward the first direction currently, controlling the virtual camera to return to a normal state.

16. The method as claimed in claim 3, wherein when controlling the virtual camera to move toward a direction opposite to the first direction for a distance of the offset, the method further comprises:
- controlling the movement of the virtual camera according to the change of the position of the virtual character continuously.

17. The method as claimed in claim 4, wherein controlling the virtual camera to move toward the direction opposite to the first direction for the distance of the offset in a speed increasing manner comprises:

When it is determined that the virtual character does not continue to move toward the first direction, controlling the virtual camera to move toward the direction opposite to the first direction for the distance of the offset in a speed increasing manner.

18. A non-transitory storage medium, storing a computer program, on which at least one computer program is stored, the at least one computer program being executed by a processor to implement the following steps:

associating the virtual camera with a position of the virtual character in the game scene to control a movement of the virtual camera according to a change of the position of the virtual character;

detecting whether a movement of the virtual character on the GUI toward a first direction satisfies a preset condition;

when the movement of the virtual character toward the first direction satisfies the preset condition, determining a shifting direction of the virtual camera according to the first direction; and controlling the virtual camera to shift toward the shifting direction according to an offset corresponding to the virtual character, while moving according to the change of the position of the virtual character, in order to display the game scene image captured by the shifted virtual camera on the GUI;

wherein the preset condition comprises: a movement distance of the virtual character toward the first direction reaches a preset distance, or a duration of the movement of the virtual character toward the first direction reaches a preset duration.

19. An electronic device, comprising:

a processor; and a memory, connected with the processor and configured to store at least one executable instruction of the processor, wherein the processor is arranged to execute the at least one executable instruction, and the at least one executable instruction comprises:

associating the virtual camera with a position of the virtual character in the game scene to control a movement of the virtual camera according to a change of the position of the virtual character;

detecting whether a movement of the virtual character on the GUI toward a first direction satisfies a preset condition;

when the movement of the virtual character toward the first direction satisfies the preset condition, determining a shifting direction of the virtual camera according to the first direction; and controlling the virtual camera to shift toward the shifting direction according to an offset corresponding to the virtual character, while moving according to the change of the position of the virtual character, in order to display the game scene image captured by the shifted virtual camera on the GUI;

wherein the preset condition comprises: a movement distance of the virtual character toward the first direction reaches a preset distance, or a duration of the movement of the virtual character toward the first direction reaches a preset duration.

\* \* \* \* \*